United States Patent [19]

Nelle et al.

[11] 4,329,736
[45] May 11, 1982

[54] LAMP SUPPORT APPARATUS

[75] Inventors: Gunther Nelle, Bergen; Johann Oberhans, Buchoster, both of Fed. Rep. of Germany

[73] Assignee: Johannes Heidenhain GmbH, Traunreut, Fed. Rep. of Germany

[21] Appl. No.: 6,887

[22] Filed: Jan. 26, 1979

[30] Foreign Application Priority Data

Feb. 14, 1978 [DE] Fed. Rep. of Germany ....... 2806071

[51] Int. Cl.$^3$ .......................................... G01D 11/28
[52] U.S. Cl. ..................................... 362/23; 362/89; 362/390; 362/391
[58] Field of Search ............... 362/390, 391, 448, 444, 362/23, 28, 29, 89, 368, 369

[56] References Cited

U.S. PATENT DOCUMENTS

| | | | |
|---|---|---|---|
| 1,870,609 | 8/1932 | Dake | 362/390 |
| 2,860,233 | 11/1958 | Johnson | 362/390 |
| 3,327,110 | 6/1967 | Baldwin | 362/390 |
| 3,666,940 | 5/1972 | Magi | 362/390 |

*Primary Examiner*—J. L. Barr
*Attorney, Agent, or Firm*—Hume, Clement, Brinks, Willian & Olds, Ltd.

[57] ABSTRACT

A lamp support apparatus is disclosed for mounting an incandescent lamp to an electro-optical measuring device mountable on a machine tool. This apparatus includes a spring element for resiliently mounting the lamp to the measuring device and a damping element for damping the oscillations of the lamp. The spring element and the damping element cooperate to protect the lamp from damaging oscillations such as are often encountered in a machine tool environment.

15 Claims, 5 Drawing Figures

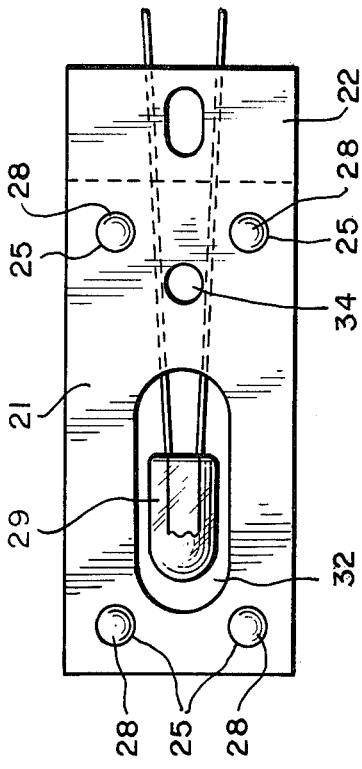
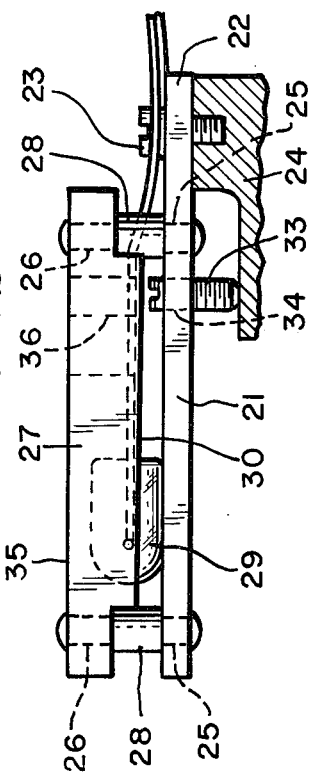
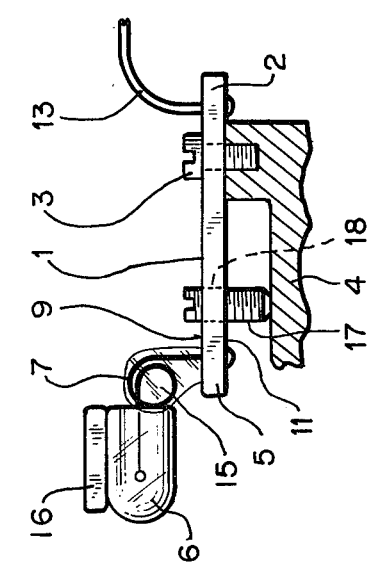
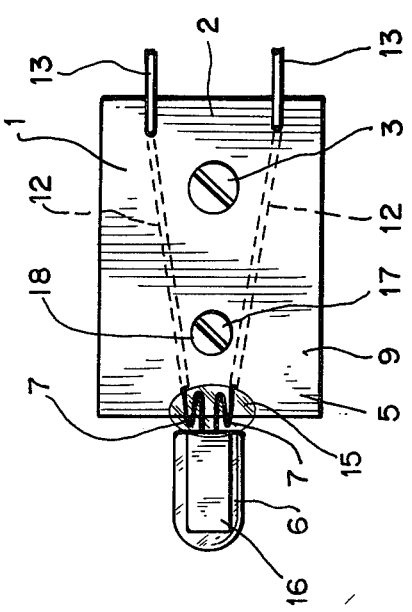

LAMP SUPPORT APPARATUS

BACKGROUND OF THE INVENTION

The present invention relates to measuring devices and, in particular, to electro-optical length and angle measuring devices which employ an incandescent lamp mounted on a fram. Such measuring devices are commonly used to measure the relative movement between moveable parts in machines such as machine tools.

Various electro-optical measuring devices of the prior art employ an incandescent lamp which is rigidly mounted to a scanning unit so as to illuminate a measuring scale. When such measuring devices are mounted on machine tools, they are often subject to damage from shocks and vibrations associated with machine tool operation. In particular, incandescent lamps have lamp coils which may tend to oscillate at a resonant frequency, and when an applied vibration is at or near the resonant frequency of the lamp coil, the coil will often vibrate at large amplitude and eventually break. This, of course, generally renders the measuring device inoperative and necessitates the replacement of the lamp.

SUMMARY OF THE INVENTION

The present invention is directed to an improved incandescent lamp support apparatus for a measuring device in which the effects of vibrations and shocks on the incandescent lamp are substantially eliminated. According to this invention, the incandescent lamp is mounted to the measuring instrument by a support apparatus which includes a spring element and a damping element.

An important advantage of this invention is that this support apparatus protects the coils of the incandescent lamp mounted in the apparatus from the vibrations, shocks and accelerations associated with machine tool operation. In this way the life of the incandescent lamp is substantially increased so that the down time of the measuring device is significantly reduced.

In one preferred embodiment of this invention, the spring element is formed by at least one connection wire of the incandescent lamp and the damping element is formed from an elastomer having high internal damping. This embodiment is particularly simple to construct.

In a second preferred embodiment, both the spring element and the damping element are provided by at least two elastomeric plugs having a high internal damping. Here, the lamp is mounted on a frame and the elastomeric plugs mount the frame to the mesuring device.

Special advantages are obtained when the incandescent lamps are provided with an additional mass so that the resonant frequency of the weighted lamp is substantially lower than the resonant frequency of the lamp coil and no undesired resonance of the lamp coil can occur.

Furthermore, in order to obtain an optimal positioning of the lamp it is preferable to make the support apparatus adjustable by means of an adjusting screw so that the coil of the incandescent lamp can be adjusted into the focal point of an illumination condensor.

The invention, together with further objects and attendant advantages, will be best understood by reference to the following detailed description taken in connection with the accompanying drawings.

BRIEF DESCRIPTION OF THE DRAWINGS

FIGS. 1a and 1b are side and top views, respectively, of a first preferred embodiment of the lamp support apparatus of this invention.

FIGS. 2a, 2b and 2c are top, side, and end views, respectively, of a second preferred embodiment of the lamp support apparatus of this invention.

DETAILED DESCRIPTION OF PREFERRED EMBODIMENTS

Referring now to the drawings, FIGS. 1a and 1b depict a first preferred embodiment of the support apparatus of this invention in which a mounting plate 1 is represented in the form of a longitudinally extended flat rectangular plate having a first end 2 which is connected by means of a screw 3 to a receiver 4 of a scanning unit (not represented) of an electro-optical length and angle measuring device. The plate 1 has a second end 5 on which is mounted an incandescent lamp 6. The lamp 6 is mounted to the plate 1 by means of two connecting wires 7 which are spirally wound as shown, and which pass through bores in the plate 1 from the upper side 9 of the plate 1. These wires 7 are soldered at the lower side 11 of the plate 1 to printed conductor tracks 12. These printed conductor tracks 12 are, in turn, soldered at the end 2 of the plate 1 to current supply lines 13 which pass through bores from the upper side 9 of the plate 1.

The spirally wound connecting wires 7, representing the spring element, are surrounded by an elastomer characterized by a high internal damping. This elastomer acts as a damping element 15. This arrangement provides simple, low cost protection for the coil of the incandescent lamp from damage resulting from the vibrations and the shocks commonly encountered in a machine tool environment, so that the life of the incandescent lamp is substantially increased.

In addition, the incandescent lamp 6 is provided with a supplementary mass 16 which is preferably mounted to the lamp 6 by means of an adhesive. The spring-mass system made up of the mass 16, the lamp 6, the wires 7 and the damping element 15 has a resonant frequency which preferably amounts to about a tenth of the resonant frequency of the lamp coil so that within the resonant frequency range of the coil no damaging resonant excitation provoked by the machine tool can occur.

Furthermore, an adjustment screw 17 is adjustably mounted in a bore 18 in the vicinity of the end 5 of the mounting plate 1. This adjustment screw 17 rests on the receiver 4 and is used to position the mounting plate 1 in such a manner that the coil of the incandescent lamp 6 is adjusted into the focal point of a not-represented illumination condensor.

FIGS. 2a, 2b, and 2c represent three views of a second preferred embodiment of the invention in which a mounting plate 21 in the form of a longitudinally extended, flat, rectangular plate is connected by means of a screw 23 at one end 22 to a receiver 24 of a not represented scanning unit. In the free part of the mounting plate 21 there are provided four bores 25 in a rectangular arrangement. These four bores 25 correspond with four bores 26 formed in a frame 27. The frame 27 presents the same extension as the mounting plate 21 and is connected with the latter by means of four plugs 28 formed of an elastomer having high internal damping. Each of these plugs 28 is positioned into the corresponding bores 25,26 of the mounting plate 21 and the frame 27.

These four plugs 28 simultaneously act as the spring element and the damping element for the incandescent lamp 29 which is mounted on the lower side 30 of the frame 27 in the middle of a longitudinally extended V-shaped groove 31, preferably by means of an adhesive. The mounting plate 21 is provided with a longitudinally extended opening 32 in the area of the neck of the incandescent lamp 29. This opening serves as an aperture through which light from the lamp 29 passes to illuminate the grating (not represented). The frame 27 also acts as an additional mass and serves to reduce the resonant frequency of the system in order to prevent any resonant excitation of the frame from falling in the range of the resonant frequency of the lamp coil.

For optimal illumination of the grating division, the mounting plate 21 is provided with a bore 34 which holds an adjustment screw 33. This screw 33 rests on the receiver 24 and is accessible through the recess 36 in the frame 27. Of course, it should be understood that other methods can be used to attach the plugs 28 to the frame 27 and the plate 21.

The lamp support apparatus of this invention protects the incandescent lamp 6,29 of the measuring device against damage from shocks and vibrations in all three spatial directions commonly encountered in machine tool operation. The preferred elastomer for use with this invention is either silicon rubber or perburan.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. In an electro-optical measuring device, the improved apparatus for supporting a miniature lamp comprising:
   a mounting plate secured to the measuring device;
   at least one damping element secured to the mounting plate, said damping element corprising an elastomeric member having high internal damping;
   means for securing the at least one damping element to the lamp such that the at least one damping element simultaneously provides resilient support to the lamp and damps motion of the lamp with respect to the mounting plate.

2. An apparatus for supporting a miniature incandescent lamp having at least one connecting wire in an electro-optical measuring device, said apparatus comprising:
   a mounting plate;
   means for securing said at least one connecting wire to the plate such that said at least one connecting wire provides resilient support to the lamp; and
   an elastomeric member disposed between the plate and the lamp, said member having high internal damping to damp motion of the lamp with respect to the plate.

3. The apparatus of claim 1 wherein the securing means comprises a frame defining a first bore, the lamp is mounted on the frame, the mounting plate is provided with a second bore, aligned with the first bore of the frame, and the elastomeric member is fitted into the aligned first and second bores defined by the frame and the plate such that the frame is spaced from and resiliently supported on the plate by the elastomeric member.

4. The apparatus of claim 1 or 2 wherein the elastomeric member comprises silicon rubber.

5. The apparatus of claim 2 wherein the elastomeric member comprises silicon rubber.

6. The apparatus of claim 1 or 2 or 3 further including means for adjusting the position of the mounting plate so as to place the lamp in the desired position with respect to the measuring device.

7. The apparatus of claim 1 or 2 further including a mass mounted to the lamp for decreasing the resonant frequency of the lamp with respect to the plate.

8. An apparatus for supporting a miniature lamp having a lamp coil and a pair of connecting wires in an electro-optical measuring device, said apparatus comprising:
   a mounting plate;
   means for securing the connecting wires to the plate such that the connecting wires resiliently support the lamp adjacent the plate;
   an elastomeric member disposed around the connecting wires between the lamp and the plate, said member having high internal damping to damp motion of the lamp with respect to the plate.

9. The apparatus of claim 8 wherein the connecting wires and the elastomeric member provide the sole support for the lamp.

10. The apparatus of claim 8 or 9 further including a mass secured to the lamp, said mass operating to reduce the resonant frequency of the lamp with respect to the plate to a value less than that of the lamp coil.

11. The apparatus of claim 10 wherein the mass is sized such that the resonant frequency of the lamp is about a tenth of the resonant frequency of the lamp coil.

12. In an electro-optical measuring device, the improved apparatus for supporting an incandescent lamp comprising:
   a frame defining at least two frame bores;
   means for securing the lamp to the frame;
   a mounting plate secured to the measuring device, said plate defining at least two plate bores, each aligned with a respective one of the frame bores;
   at least two elastomeric plugs fitted into the aligned bores defined by the frame and the plate, said plugs positioned to space the frame from the plate and to resiliently support the frame adjacent the plate.

13. In an electro-optical measuring device including a scanning unit and an incandescent lamp, the improved apparatus for mounting the lamp comprising:
   a mounting plate defining four spaced plate bores;
   means for securing an end section of the mounting plate to the scanning unit;
   an adjustment member interposed between the mounting plate and the scanning unit to adjust the position of the mounting plate with respect to the scanning unit;
   a frame defining four spaced frame bores, each frame bore aligned with a respective one of the plate bores;
   four plugs formed of an elastomeric material having high internal damping, each plug fitted into a respective pair of aligned bores such that each plug extends between the frame and the plate and the frame is resiliently supported adjacent the plate by the plugs;

means for securing the lamp to the frame such that the lamp is positioned between the four plugs.

14. The apparatus of claim 13 wherein the plugs are formed of silicon rubber.

15. The apparatus of claim 13 wherein the mounting plate defines a central aperture disposed between the plate bores and the lamp is secured to the frame such that the lamp is adjacent the aperture.

* * * * *

UNITED STATES PATENT AND TRADEMARK OFFICE
CERTIFICATE OF CORRECTION

PATENT NO. : 4,329,736
DATED : May 11, 1982
INVENTOR(S) : GUNTHER NELLE and JOHANN OBERHANS It is certified that error appears in the above—identified patent and that said Letters Patent is hereby corrected as shown below:

Column 1, line 8, delete "fram" and substitute therefor --frame--.

Column 3, line 44 delete "corprising" and substitute therefor --comprising--.

Signed and Sealed this

Twenty-fifth Day of January 1983

[SEAL]

Attest:

Attesting Officer

GERALD J. MOSSINGHOFF

Commissioner of Patents and Trademarks